Feb. 11, 1930.     C. H. CUNO     1,747,148
FILTERING APPARATUS
Filed April 16, 1929     2 Sheets-Sheet 1
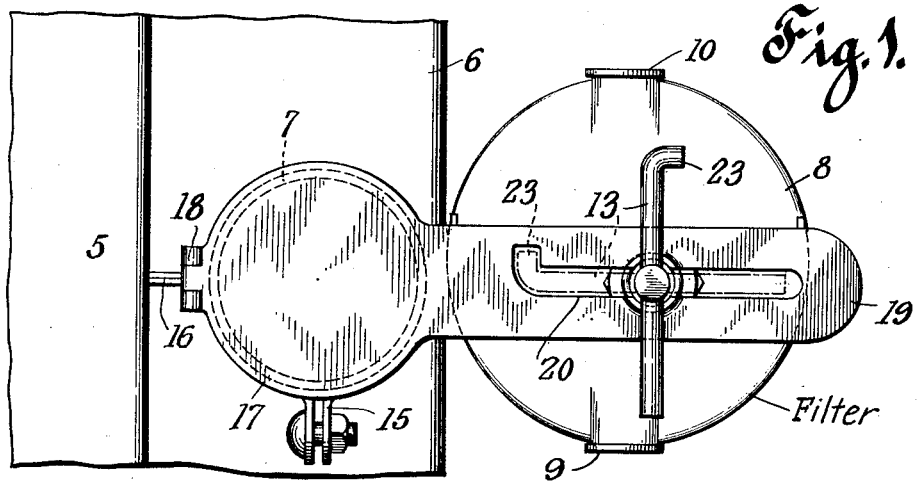
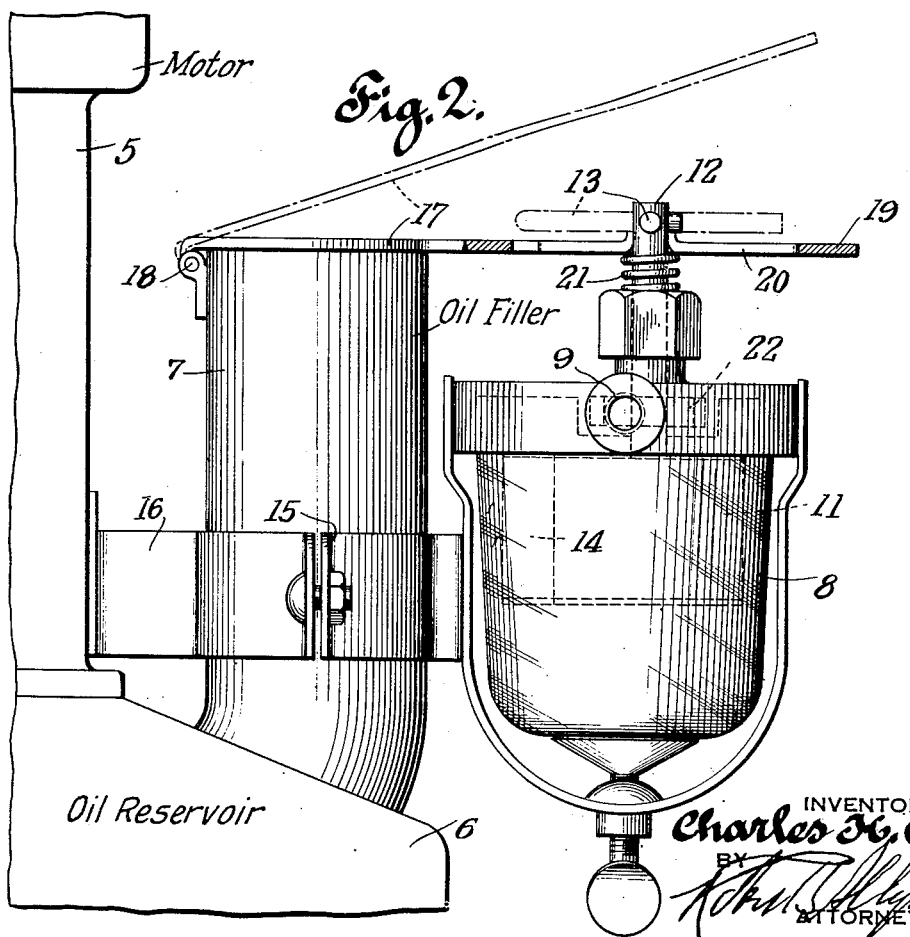
INVENTOR
Charles H. Cuno
BY
ATTORNEY Feb. 11, 1930.   C. H. CUNO   1,747,148
FILTERING APPARATUS
Filed April 16, 1929    2 Sheets-Sheet 2
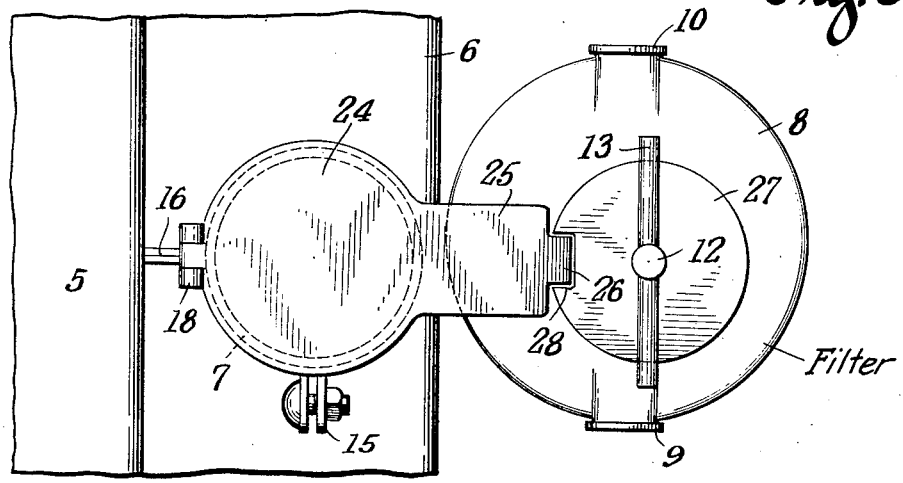
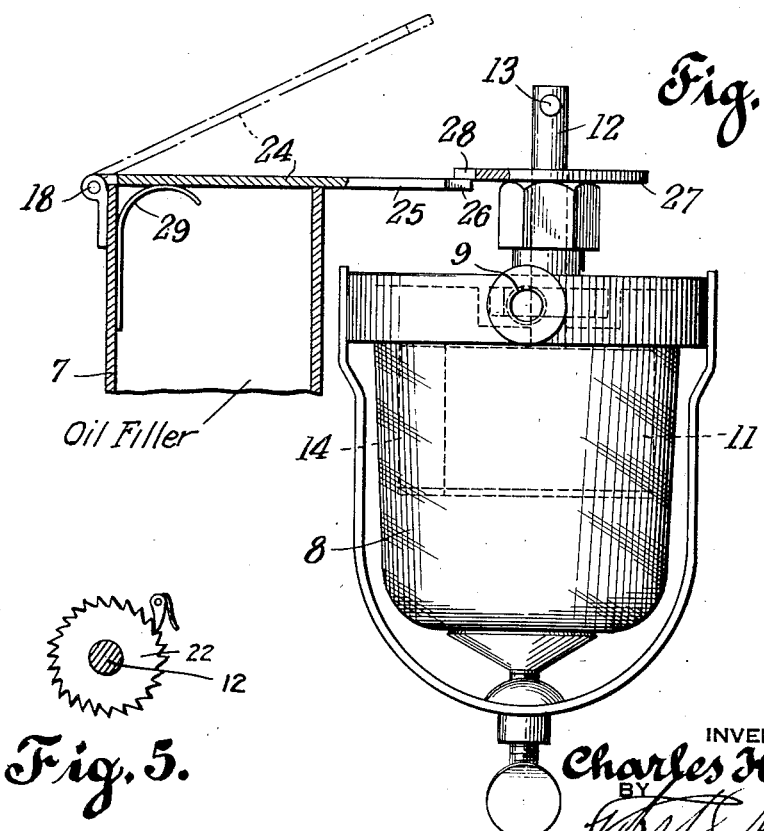

Patented Feb. 11, 1930

1,747,148

UNITED STATES PATENT OFFICE

CHARLES H. CUNO, OF MERIDEN, CONNECTICUT, ASSIGNOR TO THE CUNO ENGINEERING CORPORATION, OF MERIDEN, CONNECTICUT, A CORPORATION OF CONNECTICUT

FILTERING APPARATUS

Application filed April 16, 1929. Serial No. 355,506.

With certain types of filter, particularly such as are shown in my Patent No. 1,657,346 and in Patent No. 1,414,120 it is quite important that the straining of filtering members be frequently cleaned in order to maintain them in proper operating condition. The particular form of apparatus herein illustrated is adapted to be used in connection with the oil support of an automobile engine. Such constructions are provided with oil tanks or receptacles which have to be filled or the contents renewed from time to time. I have therefore sought to provide a simple and inexpensive construction which will assure the proper cleaning of the filter whenever the tank or other receptacle is filled.

I accordingly mount the filter adjacent the funnel or filler tube for the motor. The cover to the filler tube and the operating handle of the filter are located in such relation that it is impossible to open the filler tube for the purpose of replenishing the oil supply without partially or wholly cleaning the filter.

Fig. 1 is a plan view of apparatus embodying one form of my invention.

Fig. 2 is a vertical sectional view or side elevation of the same.

In the form shown in Figs. 1 and 2 the motor 5 has an oil receptacle or chamber 6 with a funnel or filler tube 7.

Fig. 3 is a plan view of a modified form of the invention.

Fig. 4 is a vertical sectional view of the form shown in Fig. 3.

Fig. 5 is a detail plan view showing one form of conventional clutch or ratchet mechanism to prevent backward rotation of the filter plates.

The filter has a casing 8 with an inlet 9 and an outlet 10. In this form of filter the screening device consists of a plurality of thin plates 11 through which the liquid has to pass. These plates are carried by a spindle 12 which is rotatably supported in the casing and provided with a handle 13 for convenience in rotating the screening plates. The cleaning plates 14 are supported in the casing between filtering plates so that when the plates 11 are rotated the dirt which is collected upon them is scraped out by the cleaners 14 and dropped down into the bottom of the casing.

This filter may be conveniently clamped by straps 15 to the filler pipe 7 or to the bracket 16, which is secured to the motor adjacent the filler tube.

The cover 17 of the filler tube is hinged at 18 and provided with an extension 19. The latter is provided with a slot 20 shaped to permit the extension arm to fold down over the handle 13 when the handle is in position shown in dotted lines in the drawings. The spring 21 on the shaft 12 of the filter serves to press the arm 19 upwardly against the handle when the handle is in the full position of Fig. 1, thus securely holding the plates in position and preventing rattling.

The filter member may be provided with a ratchet or clutch device 22 which will permit the filter to be rotated in one direction only.

The handle is preferably provided with an offset portion 23 and the arm 19 is provided with a corresponding offset to the slot 20 so that the handle must be rotated at least a partial revolution before the arm can be raised.

When the parts are in the full line position of the drawings the cover 17 of the filler pipe or funnel is closed and held closed by the handle 13 of the filter. To open the filler cover it will therefore be necessary to turn the handle 13 from the full line to the dotted line position so as to permit the handle to register with the slot in the arm 19, whereupon the arm and cover may be raised and oil poured into the reservoir. When the cover is closed it will not stay closed unless the handle 13 is turned somewhat. To open the filler tube again it is necessary to turn the handle forward or back, as the case may be. This therefore provides a means for compelling the cleaning or partial cleaning of the filler whenever the oil reservoir is inspected or filled. If the clutch or ratchet mechanism 22 is provided it will be necessary to make a complete revolution of the filter member. It will be obvious that the handle or other interlocking member might be geared to the filter shaft and that also other modifications may be made without departing from the spirit or scope of my invention.

With particular reference to Figs. 3 and 4 in this form of the invention, an arm 24 is hinged to the filler 7 as indicated at 18. This arm 24 is provided with an extension 25 which terminates in a reduced portion or tongue 26. Fixed to the spindle 12 at a point above the filter 8 but below the handle 13 is a disc 27, which disc is formed with a groove or recess 28 at one point on its periphery, which recess is adapted to permit the tongue 26 to pass therethrough to a point below the plane of the disc 27 so that said disc can be turned relative to said arm to bring its recess portion out of alignment with said tongue. When this is done the solid portion of the disc will abut against the tongue and hold the arm down on the oil filler as will be understood. An elongated curved spring 29, having one end fixed to the inner wall of the filler 7, at a point adjacent the hinge 18 and its other free curved end adapted to engage the arm 24, tends to urge said arm 24 upwardly.

Various changes in details might be made without departing from the spirit of the invention, and I desire to be limited only by the state of the prior art and the appended claims.

I claim:

1. A combination of a liquid reservoir having a filler opening and a filter for the liquid together with means for closing the filler opening, means for cleaning the filter and interlocking means arranged with the closing means between the interlocking means and filter and requiring motion of said filter with respect to said cleaning means for a cleaning operation of the filter to permit access to the filler opening.

2. A combination of a filler pipe and a filter together with a cover for the filler pipe, said cover having an extension, a filter cleaner, and actuating means for moving the filter relative to the filter cleaner, said actuating means having means for interlocking with said cover extension.

3. A combination of a liquid reservoir having a filler opening with a cover, said cover having an extension and a filter having cleaning means and having interlocking means coacting with the cover extension and requiring relative movement between the filter and cleaning means for at least a partial cleaning operation of the filter before the cover can be opened.

4. A liquid reservoir having a cover having a slotted extension, a filter having a cleaning handle interlocked with said slotted extension and requiring motion of said handle to release said extension from said handle.

5. The combination with a reservoir having an opening, of a closure for said opening, said closure being provided with an extension, a filter adjacent said closure and comprising spaced plates, cleaning projections between said plates, a handle connected for producing relative movement between said projections and plates, said extension being shaped for movement substantially axially of the filter past the handle in one position of the handle and for retention between the handle and filter in other positions of said handle, movement of said handle for a filter cleaning operation being necessary for release of said closure.

CHARLES H. CUNO.